Oct. 20, 1970   R. L. COOK ET AL   3,534,976
AXLE SUSPENSION SYSTEM

Filed March 12, 1968   3 Sheets-Sheet 1

INVENTORS.
ROBERT L. COOK
ERNEST C. SAMPSON

INVENTORS
ROBERT L. COOK
ERNEST C. SAMPSON

Oct. 20, 1970   R. L. COOK ET AL   3,534,976
AXLE SUSPENSION SYSTEM
Filed March 12, 1968   3 Sheets-Sheet 3

INVENTORS.
ROBERT L. COOK
ERNEST C. SAMPSON

United States Patent Office 3,534,976
Patented Oct. 20, 1970

3,534,976
AXLE SUSPENSION SYSTEM
Robert L. Cook, Southfield, and Ernest C. Sampson, Milford, Mich., assignors to Eaton Yale & Towne Inc., Cleveland, Ohio, a corporation of Ohio
Filed Mar. 12, 1968, Ser. No. 717,066
Int. Cl. B60g 19/02
U.S. Cl. 280—104.5    10 Claims

ABSTRACT OF THE DISCLOSURE

This invention relates to suspension systems for axled vehicles in which relative movement between the wheels is accommodated by a spring with the resultant oscillations thereof being dampened by fluid flow. In accordance with the illustrated embodiment of the invention, the spring and dampener structure is mounted between the axles of a tandem axle arrangement. A radius arm leads from each axle to the spring and dampener structures. The spring is illustrated as rubber in shear and the dampener structure is a rotary fluid dampener utilizing liquid in laminar flow.

BACKGROUND OF THE INVENTION

This invention relates to suspension systems in general, and more particularly to a compact device for accommodating relative movement between the axles of the tandem arrangement and for accommodating movement between the axles and the frame.

One of the difficulties inherent in prior art tandem axle suspension systems is that insufficient means are provided for dissipating energy stored in a spring member thereby causing prolonged oscillation of the suspension system following the impact of one of the wheels with an irregularity in the road surface. Accordingly, prior art suspension systems have fallen into one of two categories, to wit; systems which are too soft and allow prolonged bounding of the vehicle frame with respect to the ground engaging wheels or systems which are too hard thereby placing an undue burden on the vehicle.

It is an object of this invention to provide a suspension system for tandem axle vehicles in which a spring member allows relative movement between the axles of a tandem axle arrangement wherein the energy stored in the spring is rapidly and expeditiously dissipated.

Another object of this invention is to provide a suspension system for heavy duty vehicles in which energy imparted to the vehicles wheels is dissipated by a spring utilizing a resilient material in shear and a rotary liquid dampener.

Still another object of this invention is to provide a tandem axle suspension utilizing a rotary liquid dampener constructed and arranged to dissipate energy in proportion to the vertical velocity of the ground engaging wheels.

Still another object of this invention is to provide a suspension system for use in tandem axle vehicles wherein up and down movement of the vehicle wheels is translated into rotary movement of a rotary spring and a rotary liquid filled dampener.

DETAILED DESCRIPTION OF THE PREFERRED EMBODIMENT

Figure 1:
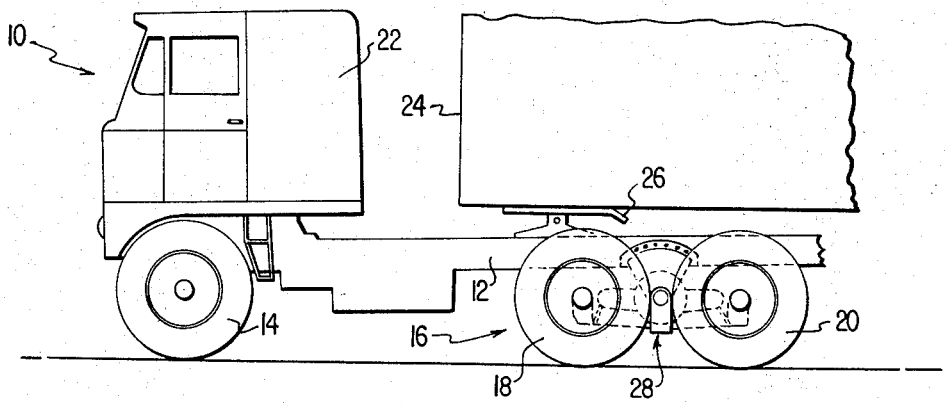
FIG. 1 is a partial side elevational view of a vehicle equipped with a suspension system made in accordance with the principles of this invention.

Attention is now directed to FIG. 1 wherein there is shown a vehicle 10 comprising a frame 12 supported from an underlying surface by a pair of steerable front wheels 14 and a tandem axle arrangement 16 having suitable ground engaging wheels 18, 20. A cab 22 is located adjacent the front end of the frame 12. In the illustrated embodiment, a trailer 24 is removably connected to the frame 12 by a fifth wheel 26. The suspension system 28 of this invention allows for relative movement of the several axles of the arrangement 16 as will be more fully pointed out hereinafter.

Figure 2:
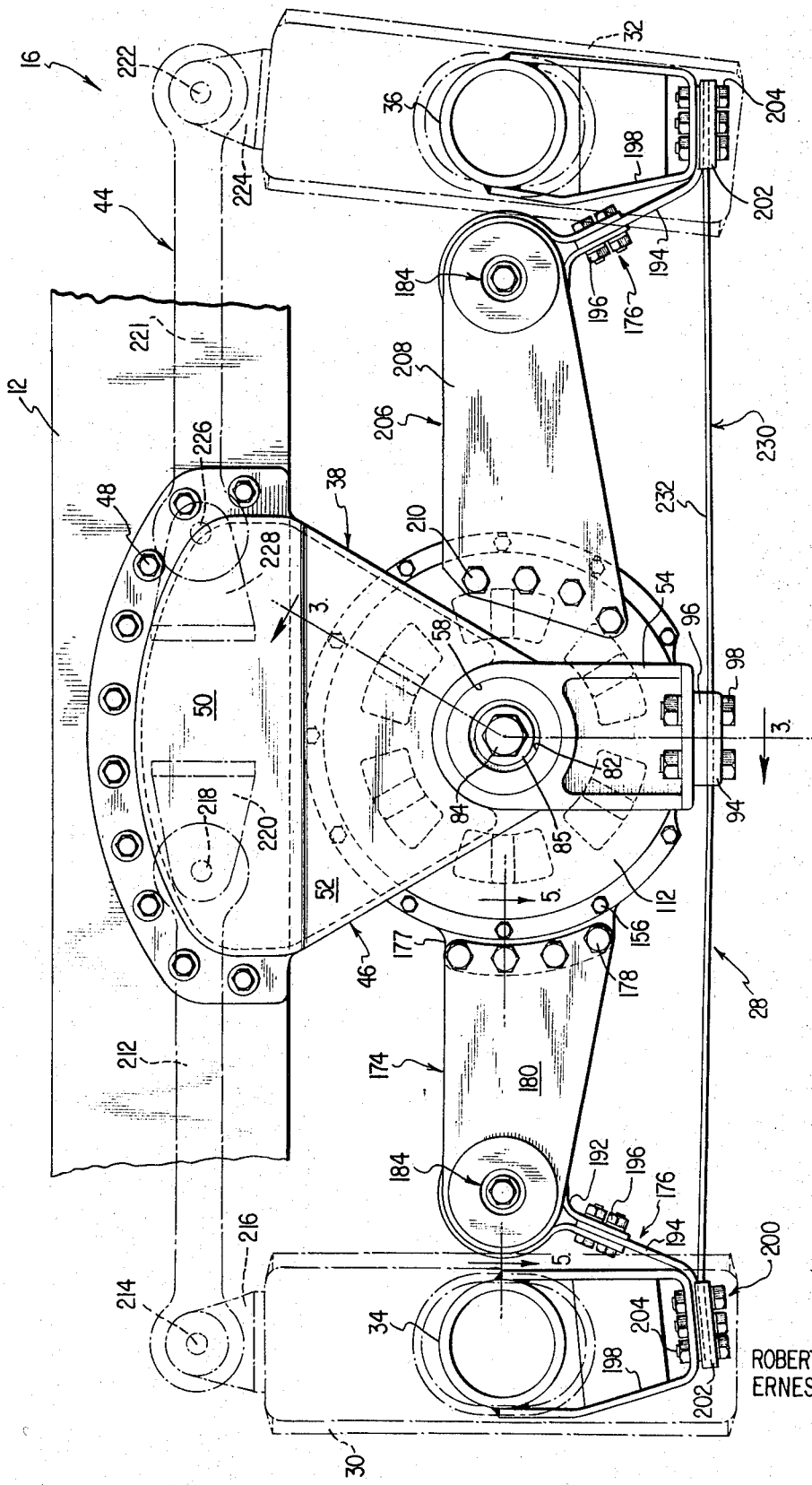
FIG. 2 is an enlarged side elevational view of the suspension system of this invention.

As shown best in FIG. 2, the tandem axle arrangement 16 comprises a first or foremost axle housing 30 and a second or rearmost axle housing 32. The axle housings 30, 32 are illustrated as of the banjo type and have transversely extending tapered casings 34, 36. Suitable drive connections (not shown) are accommodated within the housings 30, 32 and the casings 34, 36 in order to drive the wheels 18, 20.

The suspension system 28 has as major components a mounting bracket 38, a spring member 40, a dampener 42 and stabilizing structure 44. As will be pointed out more fully hereafter, the spring member 40 resiliently allows relative movement between the axle housings 30, 32, and thereafter urges the axle housings 30, 32 toward the level condition shown in FIG. 2. The spring member 40 also resiliently allows movement of the tandem axle arrangement 16 with respect to the frame 12 when there is no differential movement between the axle housings 30, 32. The dampener 42 resists differential movement of the axle housings 30, 32 and dampens the oscillations produced by the spring 40. The stabilizer structure 44 resists movement of the axle housings 30, 32 transversely with respect to the frame 12, and thereby constrains the movements of the housings 30, 32 in a generally up and down direction.

Figure 3:
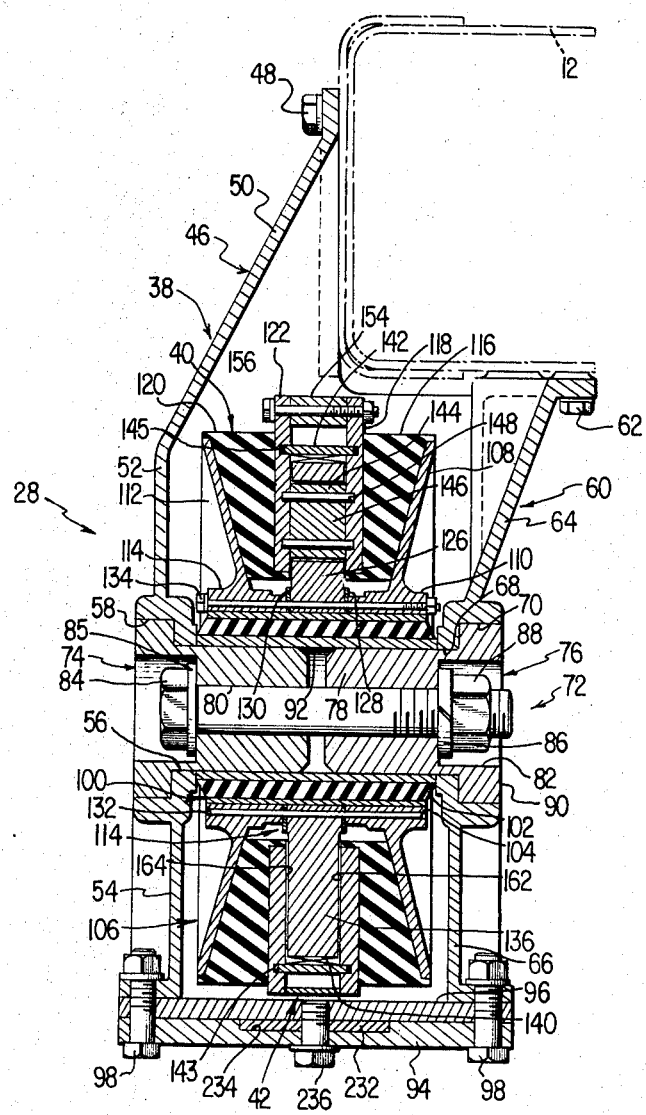
FIG. 3 is a cross-sectional view of the device of FIG. 2 taken substantially along line 3—3 thereof.

The mounting bracket 38 comprises a first support 46 secured at the upper end thereof to the frame 12, as by the use of bolts 48 or the like. A first segment 50 of the support 46 inclines downwardly and away from the frame 12 and intersects a second generally vertical segment 52 as seen in FIG. 3. The segment 52 tapers downwardly and joins a third segment 54 inwardly spaced from the second segment 52. At the junction of the second and third segments, 52, 54, an opening 56 is provided in the first support 46 and presents a recessed groove 58 adjacent the outboard side of the first support 46.

The mounting bracket 38 also comprises a second support 60 the upper end of which is secured to the frame 12 as by the use of bolts 62. A first segment 64 of the second support 60 inclines downwardly and slightly outwardly and joins a second vertical segment 66. At the junction of the first and second segments 64, 66, an aperture 68 is provided which is generally aligned with respect to the aperture 56. A recess 70 is provided in the second support 60 for purposes more fully explained hereinafter.

Securing the first and second supports 46, 60 together is a releasable connection 72 comprised of generally identical plugs 74, 76. Each of the plugs 74, 76 comprises a body portion 78 received in the aligned apertures 56, 68. A passageway 80 extends through the body portions 78 and terminates in an enlarged recess 82. A suitable bolt 84 having a washer 85 associated with the head thereof is inserted in the aligned passageways 80. A suitable lock washer 86 and nut 88 are placed on the end of the bolt 84 to draw a shoulder 90 formed by each of the body portions 78 into each of the grooves 58, 70. The connection 72 also comprises a sleeve 92 receiving the body portions 78 of the plugs 74, 76 and abutting the first and second supports 46, 60. It will be readily apparent that continued tightening of the nut 88 binds the first support 46, the connection 72 and the second support 60 together as a unit. It should be noted that a configured sleeve may be used in lieu of the plugs 74, 76 in the sleeve 92. Connecting the lower portions of the first and second supports 46, 60 together are a pair of plates 94, 96 and suitable fasteners, such as nut and bolt assemblies 98. It will accordingly be seen that the mounting bracket 38 comprises a rigid frame that may be readily assembled and disassembled and which may also be constructed from relatively simple parts.

The spring member 40 comprises a first component 100 for allowing movement of the axle housings 30, 32 with respect to the frame without differential movement between the housings 30, 32. The first component 100 comprises the rigid sleeve 92 which makes up a part of the connection 72, a resilient sleeve 102 and an outer rigid sleeve 104. The resilient sleeve 102 is made of rubber or the like and is bonded or otherwise secured to the sleeves 92, 104. It will accordingly be seen that the outer sleeve 104 is rotatable about the inner sleeve 92 and is resiliently urged to a position where the resilient sleeve 102 is unstressed. Since the connections between the housings 30, 32 and the suspension 28 are made through elements associated with the outer sleeve 104, it will be evident that the resilient sleeve 102 allows the axle housings 30, 32 to move with respect to the frame 12 independently of any relative movement between the wheels 18, 20.

The spring member 40 also comprises a housing 106 having an inwardly dished wall 108 provided with a hub 110 secured to the sleeve 104 and an outwardly dished wall 112 having a hub 114 also affixed to the sleeve 104. A first annular resilient disc 116 is bonded between the dished wall 108 and a first annular plate 118 while a second resilient annular disc 120 is bonded between the dished wall 112 and a second annular plate 122. As will be explained more fully hereinafter, the dished walls 108, 112 are connected to the axle housing 32 while the plates 118, 122 are connected to the axle housing 30. As will be apparent, relative movement between the axle housings 30, 32 act to move the plates 118, 122 with respect to the dished walls 108, 112. It will be seen that the resilient discs 116, 120, which may be of rubber or the like, are placed in shear. Accordingly the forces induced in the discs 116, 120 tend to return the axle housings 30, 32 to a position where the discs 116, 120 are unstressed. Suitable bearings may be provided if desired between the plates 118, 122 and the hubs 110, 114.

It is to be noted that the discs 116, 120 increase in thickness away from the hubs 110, 114. This accrues from the divergent nature of the dished walls 108, 112 and results in increased resilient material as the radius from the center of rotation increases. This is advantageous because the outer peripheries of the plates 118, 122 and the walls 108, 112 move a greater distance with respect to each other than do the inner peripheries thereof for any given arc of rotation. Consequently, the change in thickness of the annular discs 116, 120 minimizes the variations in stress when measured along a radial line therethrough.

The dampener 42 comprises a spoke-like arrangement 124 comprising an annular hub 126 affixed to the hubs 110, 114 of the housing 106 by a pair of shims 128, 130, a plurality of pins 132 and a number of nut and bolt assemblies 134. A plurality of spokes or arms 136 extend outwardly from the hub 126 and are of lesser width at the base than at the end thereof for a purpose to be more fully explained hereinafter. The spoke-like arrangement 124 also provides an integral ring 138 joined to each of the spokes 136 as shown best in FIG. 4. Surrounding the ring 138 is a movable bearing ring 140 which is preferably a slick material such as tetrafluoroethylene or is coated therewith. Providing circumferential support for the bearing ring 140 is an annular retainer 142 which is disposed between the annular plates 118, 122 in slots 143 with seals 145 being provided as shown in FIG. 3.

Figure 4:
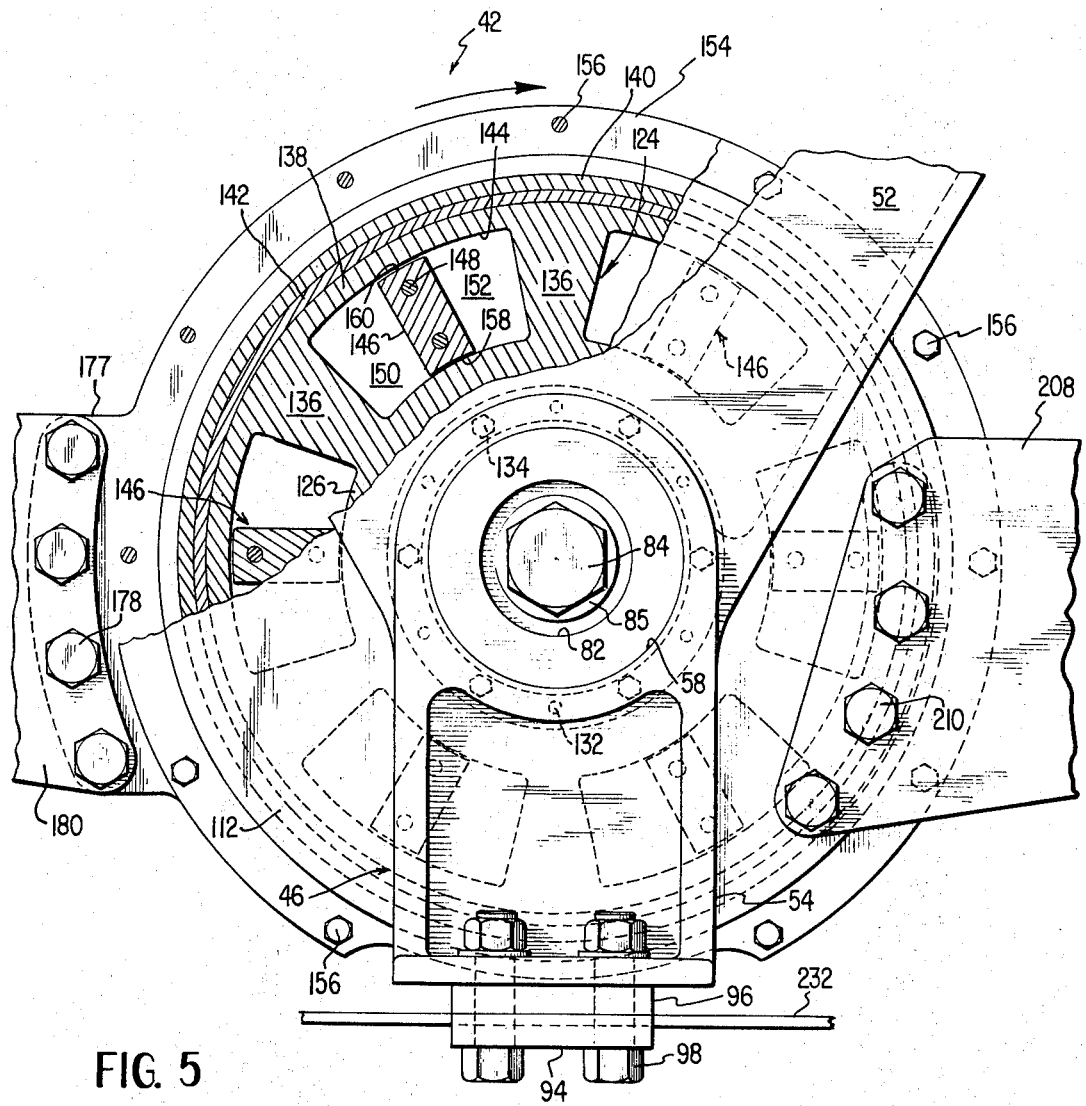
FIG. 4 is an enlarged view of the central portion of the suspension system of FIGS. 2 and 3, certain parts being broken away for clarity of illustrations.

As shown in FIG. 4, a plurality of compartments 144 are provided by the spoke-like arrangement 124 between the spokes 136. Positioned in each of the compartments 144 is a vane 146 secured between the annular plates 118, 122 by suitable pins 148. Each of the vanes 146 divides the respective compartment 144 into two chambers 150, 152 which are completely filled with a liquid such as a silicone oil, which acts to dissipate the energy stored in the rubber discs 116, 120 in a manner to be more fully described hereinafter.

Securing the annular plates 118, 122 together is a spacing ring 154 and a plurality of nut and bolt assemblies 156. It will be seen that annular plates 118, 122 are bound together for rotation about the axis of the bolt 84.

An important feature of this invention is the provision of laminar flow about the vanes 146 and the spokes 136. The vanes 146 are closely spaced to the annular plates 118, 122 to preclude liquid flow therebetween. The vane 146 is spaced slightly from the annular hub 126 to form a passageway or flow path 158 therebetween. Similarly, the outer edge of the vane 146 is spaced from the ring 138 to define a second passageway or flow path 160 therebetween.

Referring to FIG. 3, one of the lateral edges of the spokes 136 is spaced from the annular plate 118 to define another flow path or passageway 162 therebeween. Still another passageway or flow path 164 is provided by the spacing of the other lateral edge of the spoke 136 from the annular plate 122.

Assuming that the vertical spoke 136 in FIG. 4 is moved toward the cross-hatched vane 146 because of relative movement of the axle housings 30, 32, the liquid between the vertical spoke 136 and the hatched vane 146 is pressurized while the pressure of the liquid between the hatched vane 146 and the next adjacent spoke 136 decreases. There is likewise a drop in pressure in the liquid between the vertical spoke 136 and the next adjacent vane 146. Because of the difference in pressure in the liquid created by relative movement of the axle housings 30, 32, liquid in the high pressure compartment flows through the passageways 158, 160, 162, 164.

In a rotary fluid dampener of the type disclosed, the dampening moment produced by laminar liquid flow through the restricted passageways 158, 160, 162, 164 is proportional to the relative velocity between the spokes 136 and the vanes 146. Since the spokes 136 are stationarily affixed to the hubs 110, 114, it will be apparent that the dampening moment is proportional to the velocity of the vanes 146. The size of the passageways 158, 160, 162, 164 is selected to ensure laminar flow therethrough as may be calculated by one skilled in the art.

In a rotary liquid flow dampener of the type herein disclosed, turbulent liquid flow through the restricted passageways 158, 160, 162, 164 produces a dampening moment proportional to the square of the relative velocity between the spoke 136 and the vanes 146. Since the transition of liquid flow from laminar to turbulent is gradual, the dampening moment produced in the transition period varies somewhat erratically between a value proportional to velocity of the vane 146 and a value proportional to the square of the velocity of the vane 146. If one were to design the passageways 158, 160, 162, 164 to produce turbulent flow at maximum pressure differentials, laminar liquid flow will result at minimum liquid pressures resulting from moderate differential movement between the axle housings 30, 32. Since there is also a transition phase between laminar and turbulent flow, it will be readily evident that the dampening characteristics of such a device is erratic. Accordingly, it is presently contemplated that the sizes of passageways 158, 160, 162, 164 be selected to ensure laminar flow only. Accordingly, the passageways 158, 160, 162, 164 are all of substantially equal size.

Referring back to FIG. 2 a first radius arm 174 and an associated hanger 176 are positioned to connect the axle housing 30 to the spacing ring 154, the plates 118, 122 and the vanes 146. A tongue 177 is formed on the spacing ring 154 and is secured by bolts 178 or the like to a pair of structural plate-like members 180, 182 extending toward the housing 30. The members 180, 182 are secured together by a connector 184 similar in construction to the connection 72 to which reference may be had for a more complete description.

Figure 5:
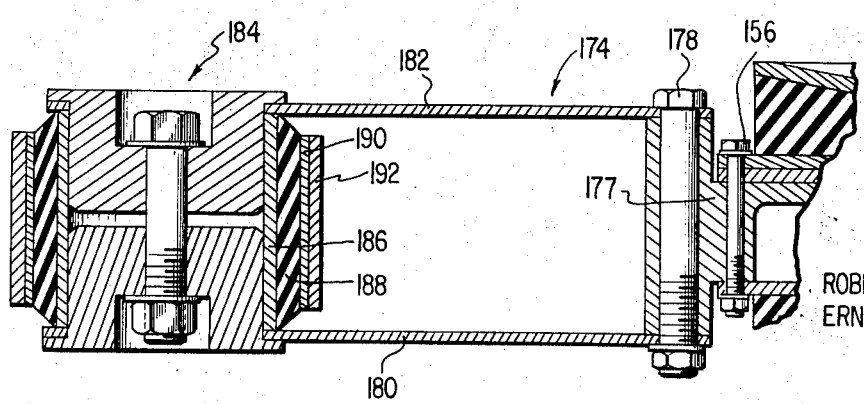
FIG. 5 is an enlarged cross-sectional view of the device of FIG. 2 taken substantially along line 5—5 thereof.

As shown in FIG. 5, the hanger 176 comprises a rigid sleeve 186 surrounding the connection 184 and acts to prevent the members 180, 182 from moving toward each other. Bonded to the sleeve 186 is a resilient sleeve or bushing 188 made of rubber or the like. An outer rigid sleeve 190 is bonded or otherwise secured to the rubber bushing 188. Disposed about the outer sleeve 190 is a strap 192 formed to engage the outer sleeve 190 tightly. The strap 192 is affixed to one end of a generally J-shaped member 194 by a plurality of fastener assemblies 196. The other end of the J-shaped member 194 is connected to a yoke or U-shaped member 198 by a connection 200 comprising a channel-shaped plate 202 and a plurality of nut and bolt assemblies 204. The yoke 198 is secured as by welding or the like to the axle casing 34. It will accordingly be seen that up-and-down movement of the axle housing 30 resulting from up-and-down movement of the wheel 18 is converted into rotary movement of the plates 118, 122 and the vanes 146.

A second radius arm 206 comprises a pair of members 208 connected to the dished walls 108, 112 by suitable fasteners 210. The outer ends of the members 208 are secured by a connection 184 with a hanger 176 securing the connection 184 and the axle casing 36. Although the hangers 176 are illustrated as made of a plurality of separate members secured together, it is to be understood that a one-piece member may be used in lieu thereof. By using separate pieces as illustrated, a vertical height adjustment may be made where these pieces are connected. It will be seen that up and down movement of the wheels 20 is changed into rotary movement of the dished walls 108, 112.

The stabilizing structure 44 comprises a first torque arm 212 pivoted about an axis 214 on a bracket 216 secured to the axle housing 30. The other end of the torque arm 212 is pivoted about an axis 218 on a bracket 220 secured to the frame 12. The stabilizing structure 44 also comprises a second torque arm 221 pivoted about an axis 222 provided by a bracket 224 affixed to the axle housing 32. The other end of the second torque arm 221 is provided about an axis 226 provided by a bracket 228 secured to the frame 12. It will be seen that the radius arm 174 and the torque arm 212 define a parallelogram structure in which the pivot axes are designated as 84, 184, 214, 218. It will also be seen that the radius arm 206 and the torque arm 221 define a second parallelogram structure in which the pivot axes are designated as 84, 184, 222, 226. It will accordingly be apparent that the axle housings 30, 32 are constrained for movement in a generally up and down fashion.

Also comprising a part of the stabilizing structure 44 is a transverse movement limiting member 230 comprised of a single leaf spring 232 secured to the first and second supports 46, 60 of the bracket 38 as shown best in FIG. 3. The plate 94 provides a recess 234 in which the spring 232 resides. A suitable metal screw 236 is threaded through the spring 232 and into the plate 96 to prevent axial movement of the spring 232. The terminal ends of the spring 232 are secured by the nut and bolt assemblies 204 between the channels 202 and the yokes 198. The leaf spring 232 is relatively stiff with respect to movement of the axle housings 30, 32 into and out of the plane of the drawing of FIG. 2 and is relatively flexible in an up-and-down direction to accommodate such movement of the axle housings 30, 32. It will accordingly be seen that the axle housings 30, 32 are constrained by the stabilizing structure 44 for generally up and down movement and are precluded from substantial movement in a transverse direction.

For purposes of illustration, it is assumed that the truck 10 is traveling in a forward direction and the wheels 18 of the tandem axle arrangement 16 strike a bump in the road thereby elevating the wheels 18 with respect to the wheels 20. Upward movement of the wheels 18 results in upward movement of the axle housings 30 and upward movement of the radius arm 174 and the arm 212. Since the radius arm 174 is connected to the plates 118, 122 and the vanes 146, these elements are rotated in a clockwise direction, FIG. 4, thereby placing the rubber discs 116, 120 in shear. Rotation of the plates 118, 122 also effects relative rotary movement between the vanes 146 and the spoke-like arrangement 124, 136. Accordingly, liquid between the vanes 146 and the spokes 136 is moved through the restricted passageways 158, 160, 162, 164, thereby dissipating a portion of the energy transmitted to the wheel from the road surface.

Since the rubber discs 116, 120 are placed in shear, the energy stored therein tends to return the plates 118, 122 to the position occurring prior to the impact of the wheel 18 with the bump in the road. If no suitable means were provided to hasten the dissipation of energy stored in the discs 118, 122 the plates 118, 122 would oscillate for an extended period until energy stored therein is dissipated by heat and hysteresis losses in the rubber. It will be seen that return movement of the plates 118, 122 toward the unstressed position causes relative movement between the vanes 146 and the spokes 136 thereby again moving the liquid through the restricted passageways 158, 160, 162, 164.

Since the size of the passageways 158, 160, 162, 164 is selected to ensure laminar flow therethrough the energy dissipated by liquid flow is proportional to the energy stored in the rubber discs 116 and 120. Accordingly, the amount of energy dissipated during the return movement of the plates 118, 122 is in direct proportion to the amount of energy stored in the rubber discs 116, 120. Even if the energy imparted to the wheel 18 is greater than can be dissipated by the dampener 42 on one cycle of movement and rebound, it will be evident that the energy is rapidly expended.

It will be seen that the suspension 28 operates in a similar manner to that previously discussed if the wheel 18 were to pass over a depression in the road surface. Similar operation of the suspension 28 occurs when the wheel 20 moves in a vertical direction because of an irregularity in the road surface.

It will also be noted that the resilient sleeve 102 allows movement of the axle housings 30, 32 relative to the frame 12 when no relative movement occurs between the housings 30, 32. Since the energy stored in the resilient sleeve 102 is relatively small, it has been found unnecessary to provide a dampener for this resilient member. The rubber bushing 188 between the hangers 176 in the radius arms 174, 206 allows limited rotary movement therebetween which is also relatively minor and does not require a dampener.

What is claimed is:

1. A suspension system for vehicles of the type having a tandem axle arrangement, the system comprising:
   a bracket for attachment to the vehicle,
   a first arm for attachment to one of the axles,
   an annular plate mounted for rotation about the center thereof and attached to the first arm for movement therewith,
   a second arm for attachment to the other of the axles, plate means attached to the second arm for movement therewith, spring means carried by the bracket and comprising an annular bodily resilient member secured along one face thereof to the annular plate and along the other face to the plate means, dampener means carried by the bracket comprising, structure providing compartment means operably connected to one of said arms, and vane structure in the compartment means operably connected to the other of said arms, and dampener liquid in said compartment means and restrictive flow passage means between said compartment means and said vane structure.

2. The suspension system of claim 1 wherein the first movable member comprises a second annular plate parallel to the first annular plate and mounted for rotational movement about the center thereof;

the spring means comprises a second annular bodily resilient disc secured along one face thereof to the second annular plate; and the second movable member comprises a second plate secured along one side thereof to the other face of the second resilient disc.

3. The suspension system of claim 2 wherein the structure comprising the compartment means is positioned between the first and second annular plates and is mounted for rotation about the center thereof; and the vane structure is affixed to the first and second plates.

4. The suspension system of claim 3 further comprising stabilizer structure for the axles including second spring means carried by the bracket for attachment to each of the axles, the second spring means being relatively flexible to up and down movement and relatively inflexible to horizontal movement.

5. The suspension of claim 4 wherein the compartment structure comprises a hub carried by the plate;

a plurality of spokes extending radially from the hub;

ring means extending about the periphery of the spokes for forming compartments between the spokes;

the annular plate means being on opposite sides of the spokes for closing the compartments;

the spokes and the plate means being spaced apart for allowing only laminar flow therebetween;

the vane structure comprises a vane positioned in each of the compartments abutting the plate means and affixed thereto;

the vanes being spaced from the hub and the ring means for allowing only laminar flow therebetween.

6. A suspension system for vehicles of the type having a tandem axle arrangement, the system comprising a first axle and a second generally parallel axle, stabilizer structure carried by the axles for attachment to a vehicle for allowing generally up and down movement and inhibiting generally horizontal movement, a mounting bracket disposed between the axle for attachment to the vehicle, a pair of members relatively rotatably connected to the mounting bracket, an axle housing rigid with each of the members, a dampener of the liquid-type carried by the mounting bracket comprising, compartment structure having a plurality of chambers for receiving a liquid, vane members in each of the chambers, dampener liquid in each of the chambers surrounding said vane members, and restrictive flow passage means between said chambers and said vane members, means mounting one of the compartment structure and vane members to each of the pair of members for rotation relative to the bracket, and spring means connecting the relatively rotatable members together and to the mounting bracket.

7. The suspension of claim 6 wherein the connection between the members and the bracket comprises resilient means.

8. The suspension system of claim 6 wherein the relatively rotatable members are annular members and the spring means is an annular resilient member disposed between and secured to the annular members.

9. A combination tandem axle and suspension system comprising:

first and second generally parallel axles, stabilizer structure carried by the axles for attachment to a vehicle for allowing generally up and down movement and inhibiting generally horizontal movement, a mounting bracket disposed between the axles for attachment to the vehicle, a member carried by the bracket extending generally parallel to the axles, first and second plates mounted for rotation around said member and first and second arm means connecting said plates to said axles, spring means connected between said plates, a dampener of the liquid-type comprising means providing a plurality of compartments about the member for receiving a liquid, vane means in each of the compartments, structure connecting the compartment means to one of the first and second arm means and structure connecting the vane means to the other of the first and second arm means, and dampener fluid in said compartment means surrounding said vane means, and restrictive flow passage means between said compartment means and said vane means.

10. The combination tandem axle and suspension system of claim 9 wherein the vane means and the compartments are arranged to provide passageways across the vane means of a size to allow only laminar flow therethrough.

References Cited

UNITED STATES PATENTS 3,013,808 12/1961 Willetts.
2,814,362 11/1957 Sweeney _____ 188—93

PHILIP GOODMAN, Primary Examiner

U.S. Cl. X.R.

188—93